(12) United States Patent
Gupta et al.

(10) Patent No.: US 9,584,389 B2
(45) Date of Patent: *Feb. 28, 2017

(54) PHYSICAL RESOURCE MANAGEMENT

(71) Applicant: INTERNATIONAL BUSINESS MACHINES CORPORATION, Armonk, NY (US)

(72) Inventors: Manish Gupta, Neb Sarai (IN); Kim HongJin, Seoul (KR); Stefan Pappe, Heidelberg (DE)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/990,258

(22) Filed: Jan. 7, 2016

(65) Prior Publication Data

US 2016/0119212 A1    Apr. 28, 2016

Related U.S. Application Data

(63) Continuation of application No. 14/150,965, filed on Jan. 9, 2014, now Pat. No. 9,277,002.

(51) Int. Cl.
*H04L 12/26* (2006.01)
*H04L 29/08* (2006.01)
*H04L 12/911* (2013.01)

(52) U.S. Cl.
CPC .......... *H04L 43/0876* (2013.01); *H04L 43/16* (2013.01); *H04L 47/70* (2013.01); *H04L 67/1002* (2013.01); *H04L 67/1012* (2013.01)

(58) Field of Classification Search
None
See application file for complete search history.

(56) References Cited

U.S. PATENT DOCUMENTS

| | | | |
|---|---|---|---|
| 6,598,071 | B1 | 7/2003 | Hayashi et al. |
| 6,976,134 | B1 | 12/2005 | Lolayekar et al. |
| 7,478,107 | B1 | 1/2009 | Yehuda |
| 7,503,045 | B1 | 3/2009 | Aziz et al. |
| 7,703,102 | B1 | 4/2010 | Eppstein et al. |

(Continued)

OTHER PUBLICATIONS

Andrzejak et al; Bounding the Resource Savings of Utility Computing Models; Internet Systems and Storage Laboratory, Hewlett Packard Laboratories; HPL-2002-339; Dec. 6, 2002; 22 pages.

(Continued)

*Primary Examiner* — Greg C Bengzon
(74) *Attorney, Agent, or Firm* — Schmeiser, Olsen & Watts; John Pivnichny

(57) ABSTRACT

A method and system for resource management is provided. The method includes generating a physical server pool. Resources of the physical server pool and additional resources of additional physical server are monitored and monitored data is retrieved during the monitoring. A utilization rate of the additional physical server pools is determined to be less than a threshold value. In response a group of physical servers is migrated to a free server pool. The physical server pool is determined to need an additional server and each physical server pool is rated based on a calculated chance for required usage. A first physical server is allocated to the physical server pool.

13 Claims, 4 Drawing Sheets

(56) References Cited

U.S. PATENT DOCUMENTS

| | | |
|---|---|---|
| 7,765,299 B2 | 7/2010 | Romero |
| 8,032,634 B1 | 10/2011 | Eppstein et al. |
| 8,179,809 B1 | 5/2012 | Eppstein et al. |
| 8,484,355 B1 | 7/2013 | Lochhead et al. |
| 8,874,749 B1 * | 10/2014 | Vittal .................... G06F 9/5077 709/226 |
| 9,106,482 B1 * | 8/2015 | Bapat ................ H04L 29/08216 |
| 9,282,166 B2 * | 3/2016 | Markley ................. H04L 67/34 |
| 9,424,065 B2 * | 8/2016 | Singh .................. G06F 9/45558 |
| 2002/0156984 A1 | 10/2002 | Padovano |
| 2003/0018927 A1 | 1/2003 | Gadir et al. |
| 2003/0079019 A1 | 4/2003 | Lolayekar et al. |
| 2003/0177176 A1 | 9/2003 | Hirschfeld et al. |
| 2004/0051731 A1 | 3/2004 | Chang et al. |
| 2004/0054780 A1 | 3/2004 | Romero |
| 2005/0021848 A1 | 1/2005 | Jorgenson |
| 2005/0038890 A1 | 2/2005 | Masuda et al. |
| 2005/0091215 A1 | 4/2005 | Chandra et al. |
| 2005/0091217 A1 | 4/2005 | Schlangen |
| 2007/0078988 A1 | 4/2007 | Miloushev et al. |
| 2007/0233866 A1 | 10/2007 | Appleby et al. |
| 2007/0258388 A1 | 11/2007 | Bose |
| 2007/0260721 A1 | 11/2007 | Bose et al. |
| 2007/0297428 A1 | 12/2007 | Bose et al. |
| 2008/0027961 A1 | 1/2008 | Arlitt et al. |
| 2008/0077366 A1 * | 3/2008 | Neuse ................ G06Q 30/0283 703/2 |
| 2008/0205377 A1 | 8/2008 | Chao et al. |
| 2009/0019535 A1 | 1/2009 | Mishra et al. |
| 2009/0222544 A1 | 9/2009 | Xiao et al. |
| 2009/0222562 A1 | 9/2009 | Liu et al. |
| 2010/0094967 A1 | 4/2010 | Zuckerman et al. |
| 2010/0095004 A1 | 4/2010 | Zuckerman et al. |
| 2010/0162032 A1 | 6/2010 | Dodgson et al. |
| 2012/0054346 A1 | 3/2012 | Lee et al. |
| 2012/0066371 A1 | 3/2012 | Patel et al. |
| 2012/0233316 A1 | 9/2012 | Nakajima |
| 2012/0233418 A1 | 9/2012 | Barton et al. |
| 2012/0254443 A1 | 10/2012 | Ueda |
| 2012/0284408 A1 * | 11/2012 | Dutta .................... G06F 9/5066 709/226 |
| 2012/0297068 A1 | 11/2012 | Arrowood et al. |
| 2012/0324082 A1 | 12/2012 | Lee |
| 2013/0013783 A1 | 1/2013 | Breiter et al. |
| 2013/0080626 A1 | 3/2013 | Thibeault |
| 2013/0111467 A1 | 5/2013 | Sundararaj |
| 2013/0173809 A1 | 7/2013 | Hueter et al. |
| 2014/0032477 A1 * | 1/2014 | Trammel .............. G06F 9/5061 707/600 |
| 2014/0047084 A1 | 2/2014 | Breternitz et al. |
| 2014/0059232 A1 * | 2/2014 | Plattner ............... H04L 67/1029 709/226 |
| 2014/0279201 A1 | 9/2014 | Iyoob et al. |
| 2014/0325036 A1 * | 10/2014 | Jahanbanifar .......... H04L 47/70 709/220 |
| 2014/0365658 A1 * | 12/2014 | Lang ....................... H04L 67/34 709/226 |
| 2015/0120931 A1 * | 4/2015 | Padala .................. G06F 9/5027 709/226 |
| 2015/0178137 A1 * | 6/2015 | Gordon ............... H04L 67/1008 709/226 |
| 2015/0195173 A1 | 7/2015 | Gupta et al. |
| 2015/0222516 A1 | 8/2015 | Deval et al. |
| 2016/0182378 A1 * | 6/2016 | Basavaraja ........... H04L 45/745 370/235 |

OTHER PUBLICATIONS

Gmach et al.; Selling T-shirts and Time Shares in the Cloud; 2012 12th IEEE/ACM International Symposium on Cluster, Cloud and Grid Computing; May 13-16, 2012; pp. 539-546.

Notice of Allowance (Mail Date Nov. 16, 2015) for U.S. Appl. No. 14/150,965, filed Jan. 9, 2014.

* cited by examiner

PHYSICAL RESOURCE MANAGEMENT

This application is a continuation application claiming priority to Ser. No. 14/150,965 filed Jan. 9, 2014.

FIELD

The present invention relates generally to a method for managing physical resources, and in particular to a method and associated system for generating a free server pool for enabling a physical resource management process.

BACKGROUND

Performing system management includes an inaccurate process with little flexibility. Maintaining elements of a system includes a complicated process that may be time consuming and require a large amount of resources. Accordingly, there exists a need in the art to overcome at least some of the deficiencies and limitations described herein above.

SUMMARY

A first aspect of the invention provides a method comprising: generating, by a computer processor of a computing system, a physical server pool defining a dedicated group of physical servers associated with a user; monitoring, by the computer processor, resources of the physical server pool and additional resources of additional physical server pools defining additional groups of physical servers associated with additional users, wherein each physical server pool of the additional physical server pools is associated with a different user of the additional users; consuming, by the computer processor, monitored data retrieved during the monitoring; first determining, by the computer processor based on the monitoring data, that a utilization rate of the additional physical server pools is less than a specified threshold value; selecting, by the computer processor based on the first determining, a group of physical servers of the additional physical server pools for providing to a logical free server pool; migrating, by the computer processor, the group of physical servers to the free server pool; determining, by the computer processor, that the physical server pool requires an additional server; rating, by the computer processor, servers within the free server pool based on a calculated chance for required usage within an associated physical server pool of the additional physical server pools; and allocating, by the computer processor based on results of the rating, a first physical server of the free server pool to the physical server pool requesting a physical server.

A second aspect of the invention provides a computing system comprising a computer processor coupled to a computer-readable memory unit, the memory unit comprising instructions that when executed by the computer processor implements a method comprising: generating, by the computer processor, a physical server pool defining a dedicated group of physical servers associated with a user; monitoring, by the computer processor, resources of the physical server pool and additional resources of additional physical server pools defining additional groups of physical servers associated with additional users, wherein each physical server pool of the additional physical server pools is associated with a different user of the additional users; consuming, by the computer processor, monitored data retrieved during the monitoring; first determining, by the computer processor based on the monitoring data, that a utilization rate of the additional physical server pools is less than a specified threshold value; selecting, by the computer processor based on the first determining, a group of physical servers of the additional physical server pools for providing to a logical free server pool; migrating, by the computer processor, the group of physical servers to the free server pool; determining, by the computer processor, that the physical server pool requires an additional server; rating, by the computer processor, servers within the free server pool based on a calculated chance for required usage within an associated physical server pool of the additional physical server pools; and allocating, by the computer processor based on results of the rating, a first physical server of the free server pool to the physical server pool requesting a physical server.

A third aspect of the invention provides a computer program product, comprising a computer readable hardware storage device storing a computer readable program code, the computer readable program code comprising an algorithm that when executed by a computer processor of a computer system implements a method, the method comprising: generating, by the computer processor, a physical server pool defining a dedicated group of physical servers associated with a user; monitoring, by the computer processor, resources of the physical server pool and additional resources of additional physical server pools defining additional groups of physical servers associated with additional users, wherein each physical server pool of the additional physical server pools is associated with a different user of the additional users; consuming, by said computer processor, monitored data retrieved during said monitoring; first determining, by the computer processor based on the monitoring data, that a utilization rate of the additional physical server pools is less than a specified threshold value; selecting, by the computer processor based on the first determining, a group of physical servers of the additional physical server pools for providing to a logical free server pool; migrating, by the computer processor, the group of physical servers to the free server pool; determining, by the computer processor, that the physical server pool requires an additional server; rating, by the computer processor, servers within the free server pool based on a calculated chance for required usage within an associated physical server pool of the additional physical server pools; and allocating, by the computer processor based on results of the rating, a first physical server of the free server pool to the physical server pool requesting a physical server.

The present invention advantageously provides a simple method and associated system capable of performing system management.

DETAILED DESCRIPTION

Figure 1:
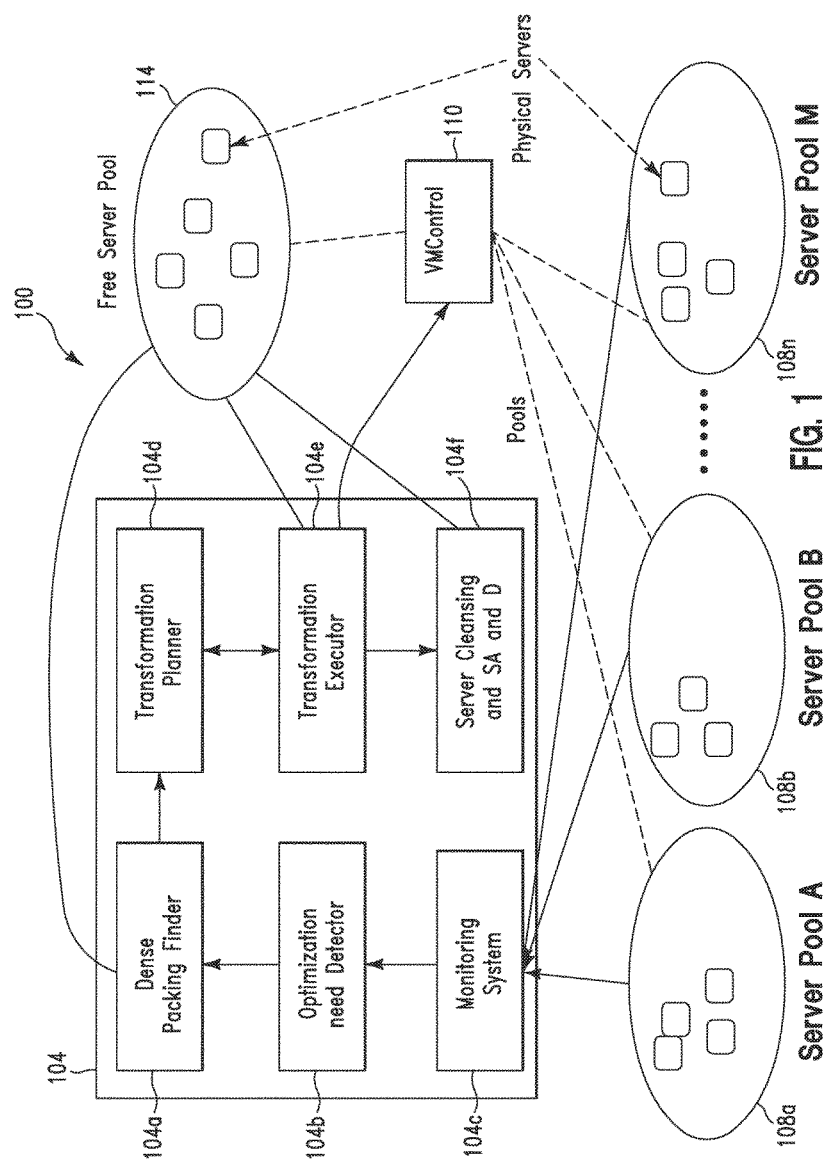
FIG. 1 illustrates a system for sharing physical servers across multiple customers, in accordance with embodiments of the present invention.

FIG. 1 illustrates a system 100 for sharing physical servers across multiple customers, in accordance with embodiments of the present invention. System 100 enables a method for managing physical servers and generating a free server pool 114 for enabling a physical resource management process. System 100 of FIG. 1 includes Physical server pools 108a . . . 108m, a free server pool 114, a virtual machine control module 110 (i.e., comprising any type virtualization manager including, inter alia, vCenter from VMWare, etc.), and a maintenance system 104. Maintenance system 104 may comprise a hardware/software system. Maintenance system 104 comprises a dense packing finder module 104a, an optimization detector 104b, a monitoring module 104c, a transformation planner module 104d, a transformation executer module 104e, and a server cleansing module 104f Free server pool (FSP) 114 comprises physical servers (allocated from server pools 108a . . . 108m) that are no longer in use by a customer. Additionally, FSP 114 allows a customer requiring a server to retrieving a server for use. Monitoring system 104c monitors server pools 108a . . . 108m (each belonging to only one customer) for metrics. Monitored metrics may include, inter alia, CPU utilization of virtual machine (VM) processes, physical memory utilization of VM processes, VM to VM network flow processes, etc. Optimization need detector module consumes monitored data (i.e., from monitoring system 104c) to determine if a resource utilization rate of any of server pools 108a . . . 108m has fallen. If a utilization rate falls below a specified threshold, then decision is executed with respect to freeing a server from use and adding the server to FSP 114. Dense packing finder module is executed to perform a consolidation process for determining free servers for FSP 114. The consolidation process provides a target configuration for determining a virtual (VM) associated with a host. Transformation planner component 104d comprises a component responsible for computing a "low" cost approach to transferring from a current configuration of VMs to a new configuration thereby freeing up specified physical servers. When a plan to achieve a target configuration is obtained, then the plan is executed by transformation executor 104e. The executed plan comprises migrating VMs from originating hosts to alternative hosts to achieve the transformation. At various times, (customer) server pools 108a . . . 108m may become highly utilized and demand more physical servers, therefore system 100 allocates a physical server to a customer by retrieving an available server from FSP 114. System 100 selects a best server from FSP 114 to be presented to a request based on a lower chance of thrashing. Additionally, system 100 achieves a desired configuration with a lower cost of the configuration.

System 100 performs the following processes:
1. Physical server management within a virtualized environment that includes shared storage (on SAN) and LAN.
2. Scrubbing hosts and a hypervisor before allocating to a new server pool. For example, performing an automatic vLAN removal and extension based on a customer selected for a server.
3. A lazy approach to perform a scrubbing process with respect to free servers until needed by a server pool. For example, rating free servers based on: a prediction of use within an original server pool, a number of free servers within a same server pool, a variability of load specified for a workload during a recent past time period, etc. in order to help minimize thrashing.
4. Accounting for resources such as, inter alia, memory and network communication between any two VMs, in order to locate out a method for densely packing VMs on hosts. A dense packing process is crucial to maintain a latency of responses by leveraging TCP/IP within a memory structure.
5. Modeling a cost of migration and providing a method to perform the reconfiguration using a low cost approach. The migration process may include generating a rating/score for an approach dependent on a size of RAM and rate of change of RAM.
6. System 100 allow physical servers to include a different number of CPUs.

Notations associated with processes performed by maintenance system 104 are defined as follows:
1. n=number of VMs in a given server pool.
2. m=number of physical servers in a given server pool.
3. #$c_j$=number of cpus on a given physical server j.
4. $cu_i$ and $mu_i$ comprise (respectively) a physical CPU and memory utilization (or demands) of the $i^{th}$ VM process.
5. $f_{pq}$ comprises a network flow (bits/sec) between VM p and VM q of a customer. Note that:
A. $f_{pq}=f_{qp}$, for each (p, q).
B. $f_{ii}$=a network flow with components other than VMs such as, inter alia, any components outside of a customer premise within a cloud.
6. $x_{ij}$=1 if an $i^{th}$ VM is on the $j^{th}$ host otherwise it is 0.

The following description comprises a process associated with flows on links due to placement of VMs on servers. If a VM p and a VM q communicate with each other and are placed on a server r and a server s respectively then all communication links connecting physical servers r and s will carry communication traffic between the two VMs. Therefore, an assumption is made with respect to providing a single primary path between any two servers. For example, if servers r and s are connected to a switch, then a path comprises switching and cable connections from the two servers r and s to the switches. If communication is within a server, then the link 1 corresponds to a software switch in a hypervisor. A link 1 may include a switch, a router, an actual physical link between a server and a switch, a physical link between two switches, a switch or a router, two routers, etc. Therefore, it is necessary to provide constraints for each of the communication links on the path between any two physical servers as follows:

Let Link(l, r, s) be 1 if the $l^{th}$ link is used for communication between r and s, o.w. 0. A flow contribution on link l if VM p and VM q are situated on server r and s respectively comprises: Link(l, r, s)$f_{pq}y_{pqrs}$, where $(x_{pr}+x_{qs})/2 \geq y_{pqrs} \geq (x_{pr}+x_{qs})/2 - 1/2$ and $y_{pqrs}$ in $\{0, 1\}$ (i.e., $y_{pqrs}$ is 1 if p is hosted on r and q is hosted on s otherwise 0). Therefore, a total flow on link l due to the placement of all the VMs on servers comprises: $\Sigma_s \Sigma_{r>s} \Sigma_p \Sigma_{q \geq p}$Link(l, r, s)$f_{pq}y_{pqrs}$.

Optimization detector 104b enables a process for determining when to free a physical server. The process is described as follows:
1. At regular intervals, optimization detector 104b determines a sum of CPU, memory, and link utilizations. The sum for CPU, memory, link utilizations, and NIC flows are defined respectively as follows: $\Sigma_j \Sigma_i cu_i x_{ij}$, $\Sigma_j \Sigma_i nu_i x_{ij}$, and $\Sigma_s \Sigma_{r>s} \Sigma_p \Sigma_{q \geq p}$Link(l, r, s)$f_{pq}y_{pqrs}$. The first two terms define CPU and memory, respectively. If any of the following inequalities are true then a process for running an optimization process to densely pack VMs on existing hosts to free one or more hosts is executed:
1. $\Sigma_j \#c_j$ 100%$-\Sigma_j \Sigma_i cu_i x_{ij} \geq k_c$ 100%, where $k_c \geq 1$.
2. m 100%$-\Sigma_j \Sigma_i mu_i x_{ij} \geq k_m$ 100%, where $k_m \geq 1$.
3. m $T_l - \Sigma_s \Sigma_{r>s} \Sigma_p \Sigma_{q \geq p}$Link(l, r, s)$f_{pq}y_{pqrs} \geq k_l T_l$, where $T_l$ is the total capacity of the link l and $k_l \geq 1$ is the required number of $T_l$ capacity drops required to initiate optimization to densely pack the VMs. $k_c$, $k_m$, and $k_l$ comprise predefined constants.

Dense packing finder module 104a: executes a consolidation method, identifies free servers in customer server pools, and computes a rating for safely using a free server for another customer. Additionally, dense packing finder module 104a determines that once upper thresholds for resource usage by a workload are violated within a measurement interval (i.e., a set of priorities), system 100 raises a demand for adding a free server to support a work load if a server pool comprises a free server. System 100 obtains a new server from FSP 114 for a given customer request for a new physical server as follows:

Create a sorted list of free servers ordered in a descending order of a rating given to a free server that depends on:
1. A likelihood that a server will not be re-requested in an original server pool in the next measurement interval.
   a. A goodness rating of the server with respect to a target server pool.
   b. Select a topmost free server in a sorted list.
2. Perform a server deactivation process.
3. Scrub a server if a target server pool is different from a source server pool.
4. Extend a vLAN(s) for customers of the server.
5. Register the server with the target server pool.
6. Zone storage pools to the server.
7. Perform a server activation process.

System 100 enables a process for densely packing VMs for freeing servers. Therefore an optimization problem is solved. The objective function of the optimization problem represents a cost that penalizes a configuration comprising usage of excessive servers and therefore to capture this we define $z_j$ to be 1 if at least one VM is hosted on physical server j, otherwise $z_j$ is defined to be 0. A cost function is defined as $\Sigma_j \#c_j z_j$, where $\#c_j$ is multiplied such that selecting a server with higher number of CPUs is penalized with respect to selecting another server with lower number of CPUs. $z_j$ is expressed in terms of decision variables $x_{ij}$ as follows: $\Sigma_i x_{ij} \geq z_j \geq x_{ij}$, for all i and j. When there is no VM on j, $x_{ij}=0$ for all i and therefore $\Sigma_i x_{ij} \geq z_j$ drives $z_j$ to 0, whereas even if there is even one VM on host j then there will exist some i for which $x_{ij}=1$ and therefore $z_j \geq x_{ij}$ will drive $z_j$ to 1.

A process for calculating capacity constraints per host j is described as follows:

For each host j, upper bounds are defined. The upper bounds are not be exceeded by any valid configuration that an optimization search problem detects. A CPU utilization value is constrained as follows: A sum of the CPU utilizations of the VMs on host j should be upper bounded by $CU_j$ and therefore $\Sigma_i cu_i x_{ij} \leq CU_j < \#c_j * 100\%$. A memory utilization value is constrained as follows: A sum of the memory utilizations of the VMs on host j should be upper bounded by $MU_j$ and therefore, $\Sigma_i mu_i x_{ij} \leq MU_j$. A link utilization value is constrained as follows:

A total link 1 utilization of the VMs on host j should be upper bounded by $NU_{lj} T_l$ and therefore $\Sigma_s \Sigma_{r>s} \Sigma_p \Sigma_{q \neq p} Link(l, r, s) f_{pq} y_{pqrs} \leq NU_{lj}$ where $NU_{lj}$ comprises a percentage.

Integrity constraints are defined as follows:
1. $\Sigma_j x_{ij}=1$: Each VM i must be hosted on at least one physical server.
2. $\Sigma_j \Sigma_i x_{ij}=n$: There are n VMs hosted on at most m physical servers.
3. $\Sigma_j z_j \leq m-1$: At most m physical servers are selected after dense packing. Since consolidation is the objective, r.h.s. of the above inequality equals m−1 as at least one server must be freed.

Co-location constraints are calculated within a workload. Co-location constraints comprise constraints for VMs of a workload which may be placed on particular hosts. If there are VMs for a workload which may not be placed on particular hosts then the respective $x_{ij}$ variable is defined as 0. If two VMs (e.g., 1 and 3) may not be co-hosted on host j, then the following constraints are added: $\Sigma_{i=1,3} x_{ij}=1$ (anti-colocation).

An overall scenario for performing a dense pack process is described as follows:
$\Sigma_j \#c_j z_j$ is minimized and subjected to the following threshold constraints, integrity constraints, and z, x, y constraints:

Threshold Constraints
1. For all servers: $\Sigma_i cu_i x_{ij} \leq CU_j$
2. For all servers' MEM: $\Sigma_i mu_i x_{ij} \leq MU_j$
3. For all links l: $\Sigma_s \Sigma_{r>s} \Sigma_p \Sigma_{q \neq p} Link(l, r, s) f_{pq} y_{pqrs} \leq NU_{lj} T_l$ Integrity Constraints
1. $\Sigma_j x_{ij}=1$
2. $\Sigma_j \Sigma_i x_{ij}=n$
3. $\Sigma_j z_j \leq m-1$ z, x, and y Constraints
1. $\Sigma_i x_{ij} \geq z_j \geq x_{ij}$, for all i and j
2. $(x_{pr}+x_{qs})/2 \geq y_{pqrs} \geq (x_{pr}+x_{qs})/2-1/2$ and $y_{pqrs}$ in $\{0, 1\}$ An existing configuration (i.e., a current placement of VMs on a host) is transformed by an optimization dense packing process. A cost of the transformation depends on a business criticality (e.g., $C_i$, of a VM, where VM i to be migrated is represented in terms of a loss to business if the VM goes down). An overall probability of failure if the VM is migrated (e.g., say $R_i$) comprises an expected cost of: $C_i * R_i$. Additionally, the cost of the transformation depends on a size of the memory state of the VM (i.e., the bigger the memory, the more time it will take for migration and a potentially higher probability of failure due to the software related transient errors). A memory state comprises a memory size of the VM. A normalized memory size is denoted as $Mem_i$. The cost of the transformation is proportional to a rate of change of memory for a VM which is directly proportional to the write-rate of the VM. Let the write-rate of the VM i be $WR_i$. A process for normalized this number comprises dividing by the sum of the write-rates of all VMs. Therefore, the cost of the transformation is defined as $Cost_i := \max(aC_i * R_i, bMem_i, cWR_i) + aC_i * R_i * bMem_i + aC_i * R_i * cWR_i + cWR_i * bMem_i + aC_i * R_i * bMem_i * cWR_i$, where a, b, and c are user-defined in [0, 1] interval. The constants a, b, and c are user-defined constants to give relative importance to their associated terms contribution to the overall cost. The aforementioned transformation process results in one or more physical servers bring freed up such that the physical servers are removed from server pool (e.g., server pools 108a . . . 108m) and added to a free server pool (e.g., free server pool 114). When a physical server is freed up, a service provider may stop charging a tenant for that server. The following key cleansing operations are performed when a physical server is selected for a customer from a free server pool belonging to another customer:
1. Decommissioning the server for the previous owner.
2. Unregistering the physical server from the server pool to which it belonged.
3. Removeing vLAN extensions made to software switches in the physical servers.
4. Unzone storage pools from this server.
5. Performing a service activation process for the new customer.

The following factors 1 and 2 are associated with a heuristic for estimating a likelihood of choosing a free server from the free server pool when a customer makes a demand for a free server:

Factor 1

Factor 1 describes a number of free servers in an original server pool. If a number of free servers comprises a high value then it is determined that a likelihood of a server from the pool being demanded back in its original pool comprises a smaller value. Factor 1 is determined as follows:
1. Let $FS_{kj}=1$ if the jth server is in the kth server pool, otherwise 0.
2. Define a likelihood of the jth server to not be re-requested in the next interval within its own server pool as: $LFS_j := \Sigma_t FS_{k't}/\Sigma_k \Sigma_t FS_{kt}$, where k' comprises a server pool to which the jth server belongs.

Essentially $LFS_j$ is nothing but the fraction: number of free servers in the pool of free server j/total number of free servers.

$LFS_j$ defines a likelihood that a selected server is not re-requested in the next interval and increases as a number of free servers in the original physical server pool from which it was freed increases.

Factor 2

Factor 2 describes a demand in the next interval T (i.e., T is a measurement interval for SLO). A demand estimation depends on a combination of history and domain knowledge. For example a combination: a recent history used to predict the demand (i.e., if in the recent history the demand from a customer is low it is expected that to happen in the next interval T), a time of day from past history (i.e., seasonality) to predict the demand, and domain knowledge of expected demand in the interval T. Various approaches from literature exist to predict demand and any of these can be used in our invention. Factor 2 is determined as follows: Let $LD_j$ comprise a likelihood that the $j^{th}$ is not re-requested for the next interval within its own server pool to which the $j^{th}$ server belongs and $LD_j := 1 - D_k / \Sigma_t D_t$. $LD_j$ comprises one minus a ratio of the demand for server pool k' to which the server j belongs and the total demand across all the server pools.

An overall likelihood for obtaining a free server j ($R_j$) is defined as $R_j$ min($LFS_j$, $LD_j$)+$LFS_j$*$LD_j$. The overall likelihood for obtaining a free server comprises at least a minimum of the two likelihood components $LFS_j$ and $LD_j$. A finer level gradation amongst the servers is further achieved by the product of the two likelihood components $LFS_j$ and $LD_j$.

A goodness rating of a free server is motivated by the fact that if a free server is included in a server pool and workload components are associated with on the free server it might lead to increased traffic on the vLAN. The following heuristic is used to compute a goodness rating:

For each VM p in a target server pool's workload that may potentially be hosted on the chosen free server t:
1. initialize #n=1; $goodness_t=0$.
2. For each VM q for which $f_{pq}>0$
   A. currentFlow:=$\Sigma_l \Sigma_r \Sigma_s$Link(l, r, s)$f_{pq} y_{pqrs}$
   B. targetFlow:=$\Sigma_l \Sigma_s$Link(l, t, s)$f_{pq} y_{pqts}$, //note that VM p is placed on the new server t
   C. $goodness_t := (\#n-1)goodness_t/\#n + currentFlow/targetFlow/\#n$
2. goodness=Normalize across all free servers t
3. Output=goodness An overall rating comprises a weighted average of the overall likelihood where weight comprises a goodness rating.

Figure 2A:
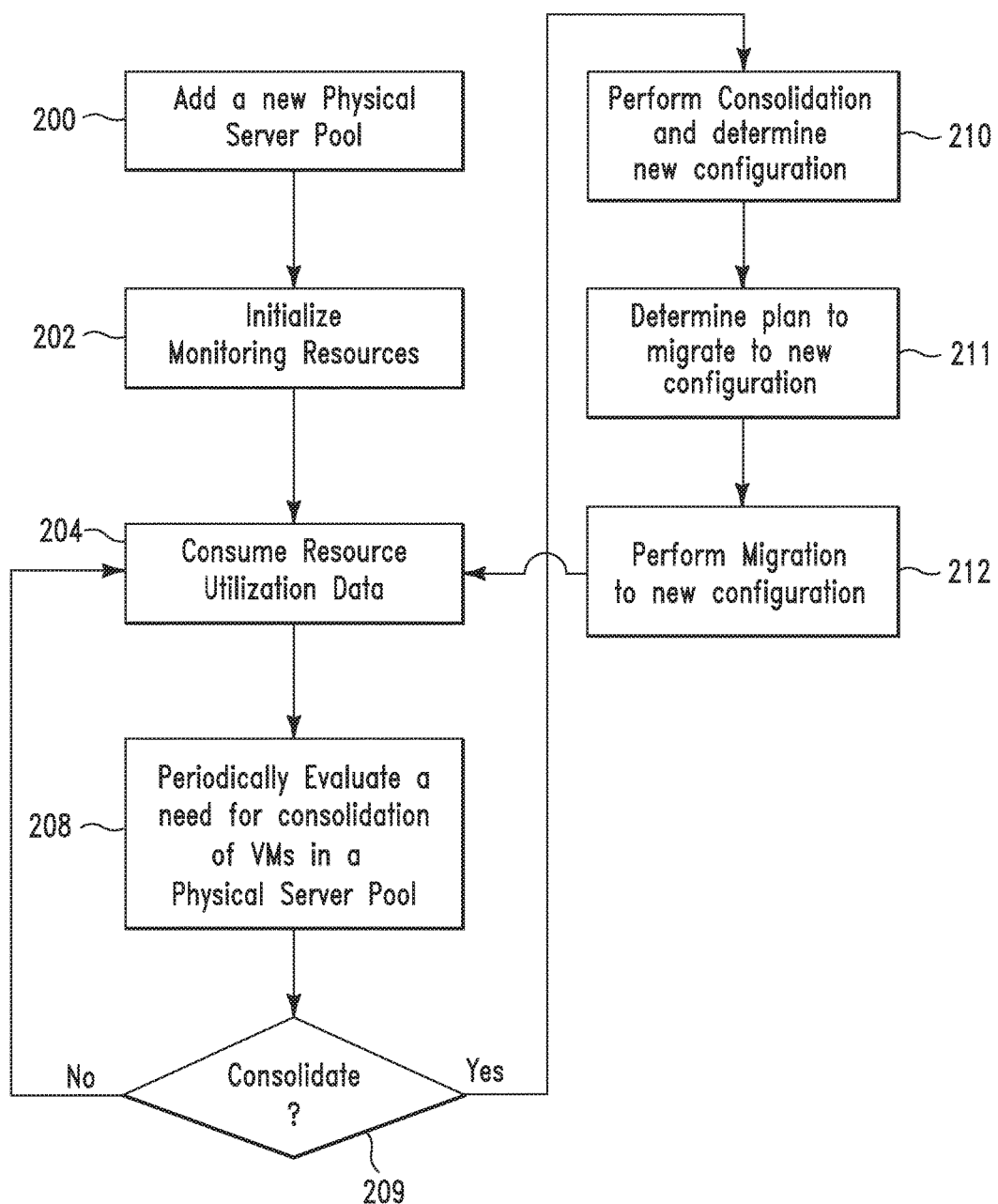
FIG. 2A illustrates an algorithm detailing a process flow enabled by the system of FIG. 1 for generating a free server pool for enabling a physical resource management process, in accordance with embodiments of the present invention.

FIG. 2A illustrates an algorithm detailing a process flow enabled by the system of FIG. 1 for generating a free server pool for enabling a physical resource management process, in accordance with embodiments of the present invention. Each of the steps in the algorithm of FIG. 2A may be enabled and executed in any order by a computer processor executing computer code. In step 200, a physical server pool (e.g., one of physical server pool 108a . . . 108m) is generated or added. The physical server pool defines a dedicated group of physical servers associated with a user. In step 202, resources of the physical server pool (i.e., generated in step 200) and additional resources of additional physical server pools (i.e., defining additional groups of physical servers associated with additional users) are monitored. Each physical server pool of the additional physical server pools is associated with a different user of the additional users. In step 204, the monitored utilization resource data retrieved during step 202 is consumed. In step 208, the system periodically evaluates a need for consolidating virtual machines in a physical server pool. For example, it may be determined (based on the utilization resource monitoring data) that a utilization rate of the additional physical server pools is less than a specified threshold value. In step 209, it is determined (based on results of step 208) if a consolidation process should be performed. If in step 209, it is determined that a consolidation process should not be performed then step 204 is repeated. If in step 209, it is determined that a consolidation process should be performed then in step 210, a consolidation process is performed and a new configuration is generated (e.g., a group of physical servers of the additional physical server pools is selected for providing to a logical free server pool). In step 211, a plan to migrate to a new configuration is determined. In step 212, the group of physical servers is migrated to the free server pool (i.e., the new configuration) and step 204 is repeated.

Figure 2B:
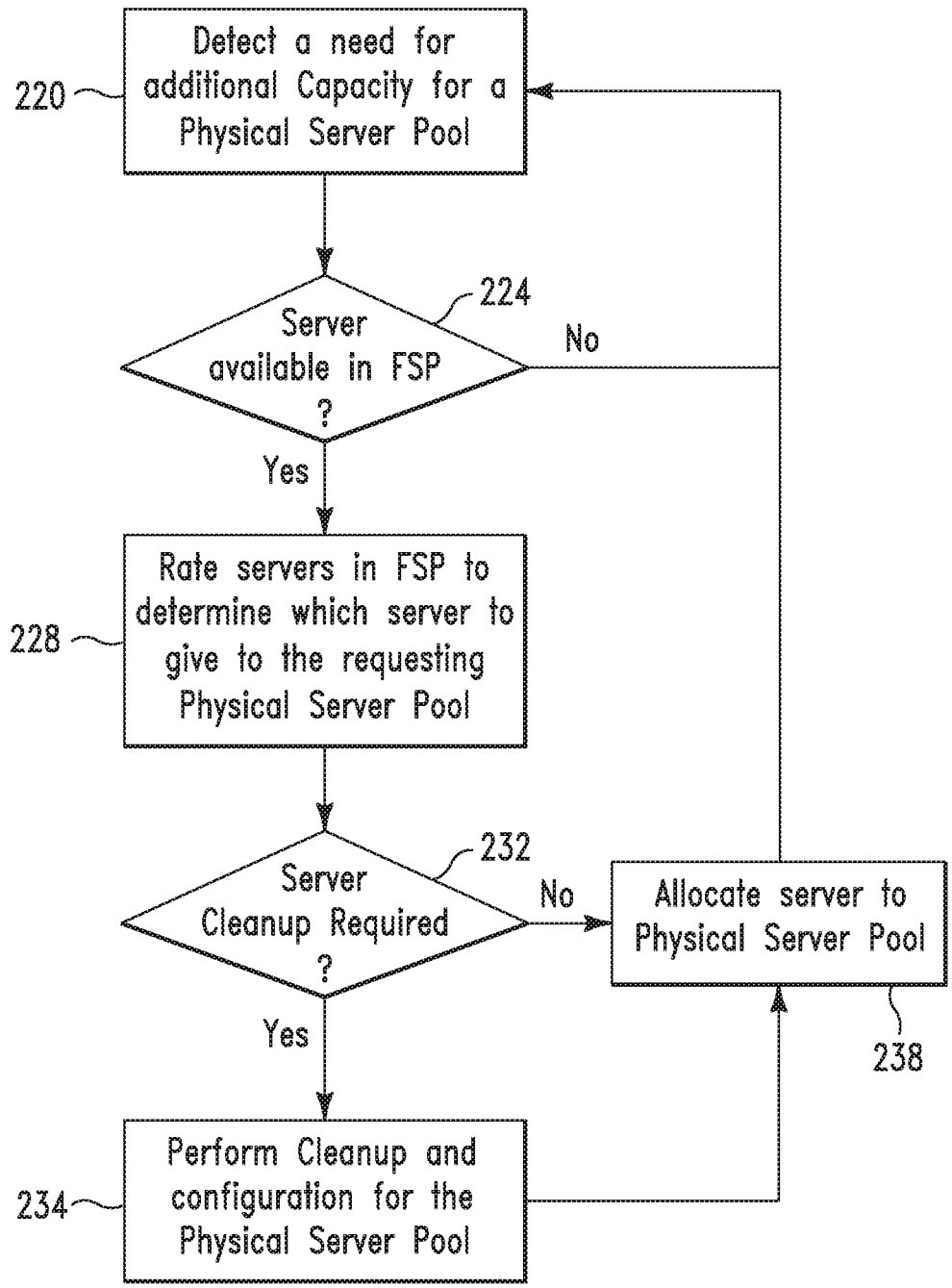
FIG. 2B illustrates an algorithm detailing a process flow enabled by the system of FIG. 1 for allocating servers, in accordance with embodiments of the present invention.

FIG. 2B illustrates an algorithm detailing a process flow enabled by the system of FIG. 1 for allocating servers, in accordance with embodiments of the present invention. Each of the steps in the algorithm of FIG. 2B may be enabled and executed in any order by a computer processor executing computer code. In step 220, a need for additional capacity for a physical server pool is detected. In step 224, it is determined if a server is available in a free server pool. If in step 224, it is determined that a server is not available in a free server pool then step 220 is repeated. If in step 224, it is determined that a server is available in a free server pool then in in step 228, each physical server pool in the free server pool is rated based on a calculated chance for required usage within an associated physical server pool. In step 232, it is determined if a server cleanup process is required. If in step 232, it is determined that a server cleanup process is required then in step 234, a cleanup and configuration process is executed with respect to the associated physical server pool and in step 238, a first physical server of the additional physical server pools is allocated to the physical server pool. If in step 232, it is determined that a server cleanup process is not required then in step 238, a first physical server of the additional physical server pools is allocated to the physical server pool.

Figure 3:
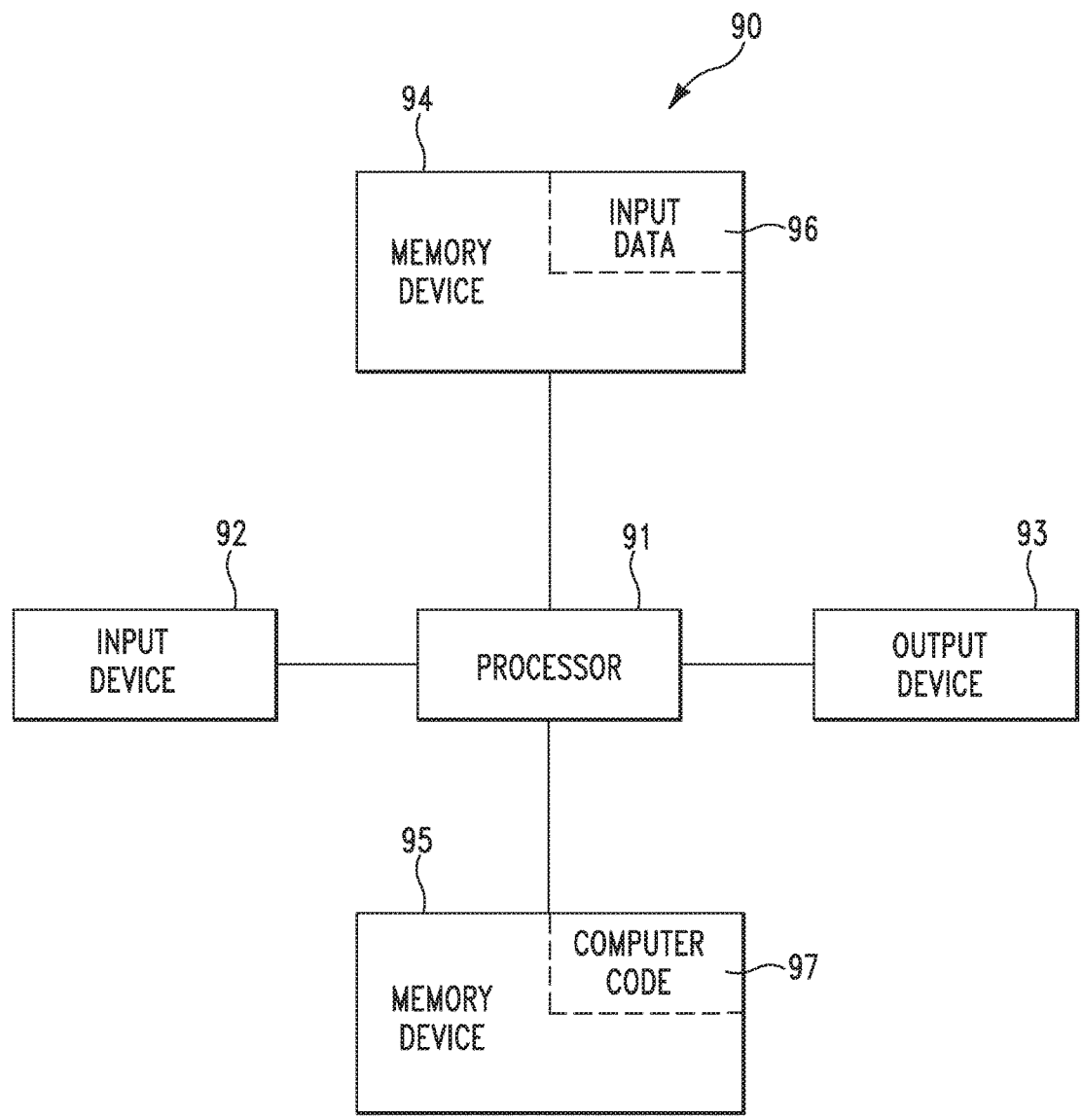
FIG. 3 illustrates a computer apparatus used by the system of FIG. 1 for generating a free server pool for enabling a physical resource management process, in accordance with embodiments of the present invention.

FIG. 3 illustrates a computer apparatus 90 used by system 100 of FIG. 1 for generating a free server pool for enabling a physical resource management process, in accordance with embodiments of the present invention. The computer system 90 includes a processor 91, an input device 92 coupled to the processor 91, an output device 93 coupled to the processor 91, and memory devices 94 and 95 each coupled to the processor 91. The input device 92 may be, inter alia, a keyboard, a mouse, a camera, a touchscreen, etc. The output device 93 may be, inter alia, a printer, a plotter, a computer screen, a magnetic tape, a removable hard disk, a floppy disk, etc. The memory devices 94 and 95 may be, inter alia, a hard disk, a floppy disk, a magnetic tape, an optical storage such as a compact disc (CD) or a digital video disc (DVD), a dynamic random access memory (DRAM), a read-only memory (ROM), etc. The memory device 95 includes a computer code 97. The computer code 97 includes algorithms (e.g., the algorithm of FIG. 2) for generating a free server pool for enabling a physical resource management process. The processor 91 executes the computer code 97. The memory device 94 includes input data 96. The input data 96 includes input required by the computer code 97. The output device 93 displays output from the computer code 97. Either or both memory devices 94 and 95 (or one or more additional memory devices not shown in FIG. 3) may include the algorithm of FIG. 2 and may be used as a computer usable medium (or a computer readable medium or a program storage device) having a computer readable program code embodied therein and/or having other data stored therein, wherein the computer readable program code includes the computer code 97. Generally, a computer program product (or, alternatively, an article of manufacture) of the computer system 90 may include the computer usable medium (or the program storage device).

Still yet, any of the components of the present invention could be created, integrated, hosted, maintained, deployed, managed, serviced, etc. by a service supplier who offers to generate a free server pool for enabling a physical resource management process. Thus the present invention discloses a process for deploying, creating, integrating, hosting, maintaining, and/or integrating computing infrastructure, including integrating computer-readable code into the computer system 90, wherein the code in combination with the computer system 90 is capable of performing a method for generating a free server pool for enabling a physical resource management process. In another embodiment, the invention provides a business method that performs the process steps of the invention on a subscription, advertising, and/or fee basis. That is, a service supplier, such as a Solution Integrator, could offer to generate a free server pool for enabling a physical resource management process. In this case, the service supplier can create, maintain, support, etc. a computer infrastructure that performs the process steps of the invention for one or more customers. In return, the service supplier can receive payment from the customer(s) under a subscription and/or fee agreement and/or the service supplier can receive payment from the sale of advertising content to one or more third parties.

While FIG. 3 shows the computer system 90 as a particular configuration of hardware and software, any configuration of hardware and software, as would be known to a person of ordinary skill in the art, may be utilized for the purposes stated supra in conjunction with the particular computer system 90 of FIG. 3. For example, the memory devices 94 and 95 may be portions of a single memory device rather than separate memory devices.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

The invention claimed is:

1. A method comprising:
    monitoring, by a computer processor of a computing system, resources of a physical server pool defining a dedicated group of physical servers associated with a user and additional resources of additional physical server pools defining additional groups of physical servers associated with additional users, wherein each physical server pool of said additional physical server pools is associated with a different user of said additional users;
    first determining, by said computer processor based on monitoring data retrieved during said monitoring, that a utilization rate of said additional physical server pools is less than a specified threshold value;
    selecting, by said computer processor based on said first determining, a group of physical servers of said additional physical server pools for providing to a logical free server pool, wherein said selecting said group of physical servers of said additional physical server pools for providing to said logical free server pool comprises:
        generating a sorted list of free servers ordered in a descending order of ratings calculated for said group of physical servers;
    migrating, by said computer processor, said group of physical servers to said free server pool;
    determining, by said computer processor, that said physical server pool requires an additional server;
    rating, by said computer processor, servers within said free server pool based on a calculated chance for required usage within an associated physical server pool of said additional physical server pools, wherein calculating each of said ratings comprises:
        selecting choose a topmost free server of said sorted list;
        deactivating said topmost free server;
        scrubbing said topmost free server;
        extending a vLAN for customers to said topmost free server;
        registering said topmost free server with a target server pool; and
        zoning storage pools to said topmost free server;
    allocating, by said computer processor based on results of said rating, a first physical server of said free server pool to said physical server pool requesting a physical server; and
    determining, by said computer processor based on a cost analysis, a target configuration associated with allocating associated physical servers of said physical server pool and said additional physical server pools to associated free server pools, wherein said method is performed by a service supplier based on a subscription, advertising, and fee basis.

2. The method of claim 1, wherein said monitoring comprises monitoring metrics associated with said physical server pool and said additional physical server pools, and wherein said metrics comprise CPU utilization metrics for virtual machine processes associated with said physical server pool and said additional physical server pools, physical memory utilization metrics for virtual machine processes associated with said physical server pool and said additional physical server pools, and virtual machine to virtual machine network flows for virtual machines associated with said physical server pool and said additional physical server pools.

3. The method of claim 2, wherein said first determining comprises:
    determining a sum of utilization values for said metrics; and
    running an optimization process with respect to associated virtual machines.

4. The method of claim 1, further comprising:
   computing, by said computer processor, a safety rating associated with using a first free server of said group of physical servers for providing to an additional user.

5. The method of claim 1, further comprising:
   providing at least one support service for at least one of creating, integrating, hosting, maintaining, and deploying computer-readable code in the computing system, said code being executed by the computer processor to implement: said generating, said monitoring, said consuming, said first determining, said selecting, said migrating, said determining, said rating, and said allocating.

6. A computing system comprising a computer processor coupled to a computer-readable memory unit, said memory unit comprising instructions that when executed by the computer processor implements a method comprising:
   monitoring, by said computer processor, resources of a physical server pool defining a dedicated group of physical servers associated with a user and additional resources of additional physical server pools defining additional groups of physical servers associated with additional users, wherein each physical server pool of said additional physical server pools is associated with a different user of said additional users;
   first determining, by said computer processor based on monitoring data retrieved during said monitoring, that a utilization rate of said additional physical server pools is less than a specified threshold value;
   selecting, by said computer processor based on said first determining, a group of physical servers of said additional physical server pools for providing to a logical free server pool, wherein said selecting said group of physical servers of said additional physical server pools for providing to said logical free server pool comprises:
   generating a sorted list of free servers ordered in a descending order of ratings calculated for said group of physical servers;
   migrating, by said computer processor, said group of physical servers to said free server pool;
   determining, by said computer processor, that said physical server pool requires an additional server;
   rating, by said computer processor, servers within said free server pool based on a calculated chance for required usage within an associated physical server pool of said additional physical server pools, wherein calculating each of said ratings comprises: selecting choose a topmost free server of said sorted list; deactivating said topmost free server; scrubbing said topmost free server;
   extending a vLAN for customers to said topmost free server; registering said topmost free server with a target server pool; and zoning storage pools to said topmost free server;
   allocating, by said computer processor based on results of said rating, a first physical server of said free server pool to said physical server pool requesting a physical server; and
   determining, by said computer processor based on a cost analysis, a target configuration associated with allocating associated physical servers of said physical server pool and said additional physical server pools to associated free server pools,
   wherein said method is performed by a service supplier based on a subscription, advertising, and fee basis.

7. The computing system of claim 6, wherein said monitoring comprises monitoring metrics associated with said physical server pool and said additional physical server pools, and wherein said metrics comprise CPU utilization metrics for virtual machine processes associated with said physical server pool and said additional physical server pools, physical memory utilization metrics for virtual machine processes associated with said physical server pool and said additional physical server pools, and virtual machine to virtual machine network flows for virtual machines associated with said physical server pool and said additional physical server pools.

8. The computing system of claim 7, wherein said first determining comprises:
   determining a sum of utilization values for said metrics; and
   running an optimization process with respect to associated virtual machines.

9. The computing system of claim 6, wherein said method further comprises:
   computing, by said computer processor, a safety rating associated with using a first free server of said group of physical servers for providing to an additional user.

10. A computer program product, comprising a computer readable hardware storage device storing a computer readable program code, said computer readable program code comprising an algorithm that when executed by a computer processor of a computer system implements a method, said method comprising:
    monitoring, by said computer processor, resources of a physical server pool defining a dedicated group of physical servers associated with a user and additional resources of additional physical server pools defining additional groups of physical servers associated with additional users, wherein each physical server pool of said additional physical server pools is associated with a different user of said additional users;
    first determining, by said computer processor based on monitoring data retrieved during said monitoring, that a utilization rate of said additional physical server pools is less than a specified threshold value;
    selecting, by said computer processor based on said first determining, a group of physical servers of said additional physical server pools for providing to a logical free server pool, wherein said selecting said group of physical servers of said additional physical server pools for providing to said logical free server pool comprises:
    generating a sorted list of free servers ordered in a descending order of ratings calculated for said group of physical servers;
    migrating, by said computer processor, said group of physical servers to said free server pool;
    determining, by said computer processor, that said physical server pool requires an additional server;
    rating, by said computer processor, servers within said free server pool based on a calculated chance for required usage within an associated physical server pool of said additional physical server pools, wherein calculating each of said ratings comprises: selecting choose a topmost free server of said sorted list; deactivating said topmost free server; scrubbing said topmost free server;
    extending a vLAN for customers to said topmost free server; registering said topmost free server with a target server pool; and zoning storage pools to said topmost free server;

allocating, by said computer processor based on results of said rating, a first physical server of said free server pool to said physical server pool requesting a physical server; and determining, by said computer processor based on a cost analysis, a target configuration associated with allocating associated physical servers of said physical server pool and said additional physical server pools to associated free server pools, wherein said method is performed by a service supplier based on a subscription, advertising, and fee basis.

11. The computer program product of claim 10, wherein said monitoring comprises monitoring metrics associated with said physical server pool and said additional physical server pools, and wherein said metrics comprise CPU utilization metrics for virtual machine processes associated with said physical server pool and said additional physical server pools, physical memory utilization metrics for virtual machine processes associated with said physical server pool and said additional physical server pools, and virtual machine to virtual machine network flows for virtual machines associated with said physical server pool and said additional physical server pools.

12. The computer program product of claim 11, wherein said first determining comprises:

determining a sum of utilization values for said metrics; and running an optimization process with respect to associated virtual machines.

13. The computer program product of claim 10, wherein said method further comprises:

computing, by said computer processor, a safety rating associated with using a first free server of said group of physical servers for providing to an additional user.

* * * * *